United States Patent [19]

Berman

[11] Patent Number: 4,703,449
[45] Date of Patent: Oct. 27, 1987

[54] INTERRUPT DRIVEN MULTI-BUFFER DMA CIRCUIT FOR ENABLING CONTINUOUS SEQUENTIAL DATA TRANSFERS

[75] Inventor: Ari P. Berman, Ashland, Mass.
[73] Assignee: Data Translation Inc., Marlboro, Mass.
[21] Appl. No.: 868,257
[22] Filed: May 28, 1986

Related U.S. Application Data

[63] Continuation of Ser. No. 470,402, Feb. 28, 1983, Pat. No. 4,599,689.

[51] Int. Cl.[4] ............................. G06F 12/00; G06F 13/00
[52] U.S. Cl. .................................................... 364/900
[58] Field of Search ... 364/200 MS FIle, 900 MS File

[56] References Cited

U.S. PATENT DOCUMENTS

| | | | |
|---|---|---|---|
| 4,188,665 | 2/1980 | Nagel et al. | 364/200 |
| 4,378,588 | 3/1983 | Katzman et al. | 364/200 |
| 4,410,942 | 10/1983 | Milligan et al. | 364/200 |
| 4,467,411 | 8/1984 | Fry et al. | 364/200 |
| 4,486,831 | 12/1984 | Wheatley et al. | 364/200 |
| 4,599,689 | 7/1986 | Berman | 364/200 |

*Primary Examiner*—Archie E. Williams, Jr.
*Assistant Examiner*—William G. Niessen
*Attorney, Agent, or Firm*—Wolf, Greenfield & Sacks

[57] ABSTRACT

An apparatus for controlling sequential (DMA) transfers between a plurality of buffer memories and a data translation device. Each buffer has an overrun has an overrun area associated with it. Prior to transfers from the buffers to the data translation device, the buffer memories are first "threaded" together by loading the overrun area of a first buffer with data from the next buffer. During the DMA transfer, when the first buffer becomes empty a request is made to the computer to restart the DMA operation on the next sequential buffer, but while the interrupt is being serviced data is continually being transferred out of the first buffer's overrun area. Alternatively, for transfers from the data translation device to the buffers, after the first buffer is full, an interrupt is generated and incoming data is stored in the first buffer's overrun area while the interrupt is being serviced. After the interrupt is serviced data is stored in the next sequential buffer. Subsequently, the computer determines the exact point where the DMA process stopped depositing data in the overrun area by sequentially examining the entries in the overrun area. The computer then moves the data in the overrun area into the next buffer to complete the transfer.

13 Claims, 7 Drawing Figures

INTERRUPT DRIVEN MULTI-BUFFER DMA CIRCUIT FOR ENABLING CONTINUOUS SEQUENTIAL DATA TRANSFERS

This application is a continuation of application Ser. No. 470,402, filed Feb. 28, 1983, now U.S. Pat. No. 4,599,689, issued July 8, 1986.

FIELD OF THE INVENTION

The present invention relates to computer systems in general and more particularly to data acquisition and signal generation systems for use with computer systems.

BACKGROUND OF THE INVENTION

Computerized control apparatus for controlling many manufacturing processes and techniques is now in widespread use. Typically, a control computer system interfaces with a manufacturing process by means of data acquisition and signal generation devices. Data acquisition devices sample selected variables in the manufacturing process at predetermined intervals and convert the measured variables into digital codes suitable for use by the computer. Alternatively signal generation devices are used to translate the digital codes produced by the computer into analog signals suitable for controlling the manufacturing process.

In some systems, the measured variables are transferrred to the computer system's main memory. The processor then performs computations on the data in main memory and provides output signals which can be used to control the ongoing process. In other systems, incoming data from the sampling circuits is transferred from main memory to a secondary storage unit and later retrieved for analysis. This latter method is typically used when data rates exceed the real-time processing capabilities of the system.

In the latter type of data acquisition system, data is sampled at a steady rate and each sample is temporarily stored in the data acquisition device before being transferred to a plurality of temporary storage or buffer areas located in the computer's main memory. Generally, in order to reduce the processing requirements on the main computer the transfer of data from the data acquisition device to the storage area is performed by a direct memory access (DMA) unit. This well-known unit contains the logic circuitry to generate the necessary address information and commands to transfer information from the data acquisition device to the storage area without direct intervention by the computer system. In order to initiate a DMA transfer, the computer sends the DMA unit the starting address of a buffer memory at which to begin storing the transferred information and the number of information words to be transferred (called the word count). The computer then enables the DMA unit which independently performs the transfers. The DMA unit then monitors the number of words transferred and when the specified number have been transferred, the DMA unit stops transferring data and notifies the computer system by a standard interrupt procedure. The computer then provides the DMA unit with the starting address of a new buffer area and the new word count and restart the unit. After the DMA unit has been enabled, the computer may usually perform other calculations.

When the buffer memory areas in the computer's memory become filled, the data is transferred by another DMA unit to a large secondary storage located on the computer's peripheral bus. In order to provide for continous transfer of information between the data acquisition device and the secondary storage a technique known as "double-buffering" is used. In this technique at least two separate buffer memory areas are used for transfer of data. Since the buffer areas are separate, data can be transferred from a data acquisition device to a first buffer area under control of one DMA unit while data is simultaneously being transferred from the second buffer area to the secondary storage unit under control of the other DMA unit. Since data transfer from a buffer memory to the secondary storage is generally faster than data transfer from the data acquisition device, the second buffer generally becomes empty before the first buffer is filled so that when the first buffer does become filled, new incoming information can be transferred to the empty second buffer while the first buffer is being emptied.

However, in a control system in which data is being sampled at a rapid, steady rate, it is possible to "lose" data samples if the time between data samples is less than the time required to restart a DMA transfer operation. Data loss occurs because the DMA process stops after an interrupt has been generated and a typical data acquisition unit contains very limited storage capabilities, therefore, any data which is sampled before the DMA process is restarted is not transferred to main memory. The time to restart the DMA proces is generally the sum of the maximum time the computer requires to recognize and service an interrupt and the time required to execute the routine which loads the DMA unit with the address and word count information and enables the transfer operation.

A corresponding problem occurs when data is being transferred from the buffer storage area to a signal generation device where the translated data is being used to control an ongoing process. If the transfer rate exceeds the time required to restart the DMA process when one buffer memory has been emptied, an interruption in data flow (generally called a data "underrun" or "delay") will occur. In some systems a small data delay is not serious, but in other systems it can produce catastophic results.

In order to eliminate data losses and delays, several prior art schemes have been developed. One conventional arrangement is to provide a "dual-port" memory in the data acquisition or translation device. With a dual-port memory, data can be stored and retrieved simultaneously via the two separate ports. Thus data can be transferred from the buffer area to the memory through one port and simultaneously removed from the memory from another port before the memory has become filled.

A similar scheme uses a first in, first out (FIFO) buffer memory located in the data acquisition or translation units. In this arrangement, data can also be stored and withdrawn simultaneously from the FIFO memory.

Other prior art systems have used two independent DMA controllers to control transfers between the data acquisition device and the buffer areas so that a second DMA operation can be started before the first DMA unit has finished emptying or filling a buffer area.

The problem with the above prior art techniques is that the all require complex circuitry in each of the data acquisition or translation units. Since a typical control system may incorporate a large number of such units, the cost of providing special memories or dual DMA units becomes prohibitive. In addition, the extra circuitry requires space on the data transfer unit printed circuit boards where such space is often severely limited.

It is therefore an object of the present invention to provide a data transfer system in which data can be transferred between a computer system and data acquisition or translation units continuously at any speed up to nearly the computer system throughput limitation without introducing any data losses or delays.

It is a another object of the present invention to provide a continuous data transfer system which utilizes only single port memories and does not require complex circuitry.

It is yet another object of the present invention to provide a data transfer system which can be completely controlled from the computer system via a software routine.

SUMMARY OF THE INVENTION

The foregoing problems are solved and the foregoing objects are achieved in one illustrative embodiment of the invention in which the buffer areas in the memory containing data which is to be sequentially transferred to the data acquisition or translation units are "threaded" together to form temporarily, one large buffer area. Data is transferred between the data acquisition and translation units and this large buffer area by the conventional DMA units and the computer system maintains control over the transfer via the usual interrupt process.

More particularly, the conventional DMA arrangement is modified by assigning a dedicated additional storage area, called an "overrun" area to each memory buffer. In addition, the conventional DMA units are modified so that, when they have transferred the number of words specified by the computer they generate an interrupt to the associated computer, but then continue transferring data.

Prior to beginning a data transfer from the buffer area to a signal generation unit, the computer system "threads" the buffers containing the sequential data to be transferred together by copying a portion of the data contained in a buffer into the overrun area of the immediately preceeding buffer in the sequence. Subsequently, data transfer is enabled and proceeds in a conventional manner. However, when the DMA unit completes transfer of the number of words specified by the computer, it generates an interrupt but continues to transfer data from the associated overrun area. After the interrupt has been acknowledged, the computer system "corrects" the address and word count information provided to the DMA unit so that the last data word taken from the overrun area and the first data word taken from the next buffer will be contiguous elements.

The operation of the data transfer system on data transfers which take place from a data acquisition device to the buffers is similar. Prior to performing such a transfer the computer stores in each overrun area a special code which cannot occur in the incoming data unless an error has occurred. Data is then transferred from the data acquisition unit to a buffer by the DMA unit in a conventional manner. As before when the specified number of data words has been transferred the DMA unit generates an interrupt but continues transferring data to the overrun area associated with the buffer. The transferred data overwrites some of the code words previously stored in the overrun area.

After the interrupt has been acknowledged, the computer corrects the address and word count information so that the last data word taken from the overrun area and the first data word taken from the next buffer will be contiguous elements.

However, in the case of incoming data the buffers are now "threaded" together and must subsequently be "unthreaded" to place the data in proper form for subsequent processing. This unthreading can be done in parallel with an ongoing DMA transfer.

In order to unthread the data, the computer must determine the exact point where the DMA unit stopped storing data in each overrun area and started writing into the next buffer. To determine this point a sofware routine inspects each word in an overrun area. If the word is not the predetermined code word it is transferred to the next succeeding buffer. Word-by-word transfer continues until all non-code words have been transferred.

DETAILED DESCRIPTION OF THE PREFERRED EMBODIMENT

Figure 1:
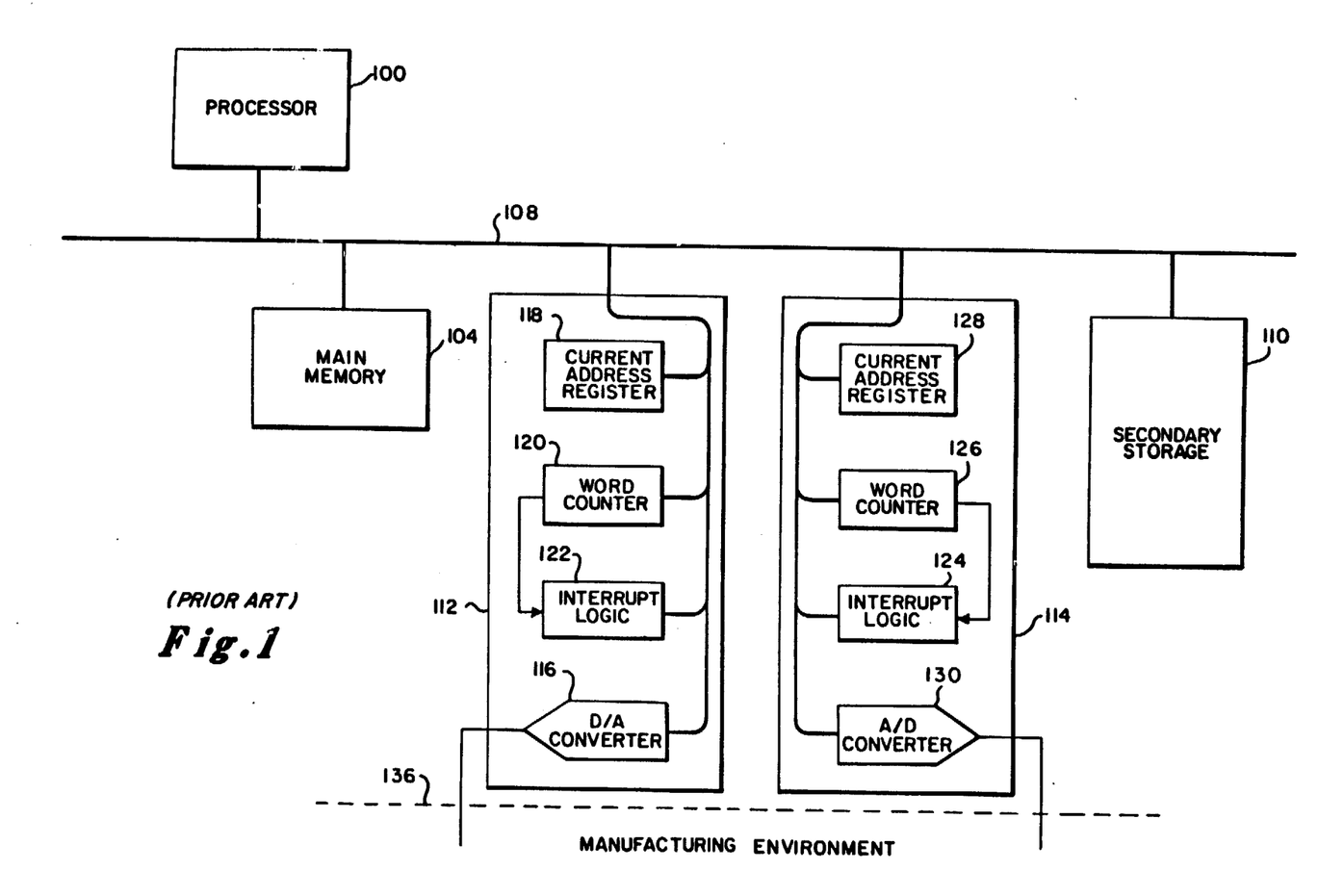
FIG. 1 is a block schematic diagram of a typical computer system which controls a manufacturing environment by means of data acquisition and signal generation units.

FIG. 1 is a generalized block diagram of a conventional computer system which is being used to control a manufacturing environment. The computer system may be controlling a manufacturing process or machines in accordance with a predetermined process or the system may be under real-time control in that process decisions are made in response to conditions sensed in the environment.

The computer system typically consists of a processor 100 which is coupled by a bus 108 to a secondary storage unit 110, a plurality of interface units which may include signal generation unit 112 and data acquisition unit 114 and a main memory 104. The outputs of unit 112 are used to control actuator transducers 132. Transducers 132 are conventional, well-known devices are used to control valves or operate machinery which, in turn, controls manufacturing environment 136.

Conditions in manufacturing environment 136 may be sampled by transducers 134 which are also conventional, and well-known. The outputs of these transducers, in turn, can be sampled and converted to digital codes by unit 114 and sent over bus 108 to processor 100 or main memory 104.

Processor unit 100 consists of an arithmetic logic unit 102 which performs the actual data processing calculations, such as addition and subtraction, on data stored in main memory 104. Processor 100 may also include a memory management unit 105 which is a well-known device that, in response to the software routines running in the processor allocates areas in main memory 104. The construction and operation of processor 100 and its components is well-known and its details are unimportant for an understanding of the invention. Consequently it will not be discussed in further detail.

Data can optionally be transferred from main memory to a secondary storage device which typically is a disc or tape unit with a large storage capacity.

In a typical control system incoming data from unit 114 is temporarily stored in main memory 104 utilizing the double buffering technique described previously. The data is then transferred by a DMA unit to the secondary storage unit 110. Similarly, the results of calculations performed by processor 100 stored in secondary storage unit 110 are first moved to temporar buffer areas in main memory 104 again utilizing the double buffering scheme prior to being transferred to signal generation unit 112.

Data transfer units 112 and 114 are each comprised of two main components. Each unit contains either a D/A or A/D convertor circuit which actually performs the conversion between analog and digital signals. D/A and A/D circuits are conventional and readily available and will not be discussed in detail herein. The data transfer units also contain a direct memory access (DMA) unit which controls transfer of information between the convertor circuitry and the main memory 104. The data transfer circuits also contain timing and control logic which is well-known and not shown for clarity.

The DMA unit is a conventional logic circuit which can operate independently of processor 100 to transfer information between a convertor circuit and main memory 104. For example, in signal generation unit 112, a portion of the DMA logic is shown, including current address register 118, word counter 120 and interrupt logic 122.

Preparation for a DMA operation begins when processor 100 places an address in the DMA current address register 118. This address corresponds to an address in main memory 104 in which a block of data resides. The number of words in the block of data is placed by processor 100 (via bus 108) in word counter 120 (customarily, the word count number is negative). Processor 100 then enables the DMA logic in unit 112. When enabled, the DMA logic generates address and control signals to transfer data words sequentially from main memory 104, via bus 108, to D/A convertor 116 where the digital words are converted to analog signals for controlling manufacturing environment 136.

After each word has been transferred address register 118 and word counter 120 are incremented. Operation continues in this manner and words are transferred until the word count in word counter 120 reaches zero, at which point interrupt logic 122 is enabled.

In accordance with conventional operation, at this point the DMA logic in unit 112 then stops transferring data words and generates an interrupt signal which is forwarded to processor 100 via bus 108. Processor 100 responds by loading a new current address in register 118 and a new word count in word counter 120 and then reenabling the DMA unit to begin transfer of second block of data. This process repeats until all the data is transferred from memory 104 to unit 112.

Data acquisition unit 114 operates in a similar manner. More particularly, the DMA unit in data acquisition unit 114 includes current address register 128, word counter 126 and interrupt logic 124. As with unit 112, processor 100 loads a starting address in register 128 and a word count in register 126. The starting address in register 128 indicates the first buffer address into which information is to be stored. Digitized information words produced by A/D circuitry 130 are automatically transferred by the DMA circuitry in unit 114 to main memory 104 starting at the address in register 128.

As each word is transferred, the current address register and word counter are incremented and word-by-word transfer continues until the word count in counter 126 reaches zero at which point the interrupt logic 124 is enabled which generates an interrupt signal to processor 100. In accordance with conventional operation, the DMA unit then stops and waits until a new current address is loaded in register 128 and a new word count is loaded in counter 126.

One of the problems with the prior art DMA controllers is that there can be a significant delay before the processor 100 can service the interrupt. Since the DMA units in units 112 and 114 stop their transfer operations after an interrupt has been generated and must be reenabled in order to begin transfer operations again, either a delay exists in data being sent from the computer to the manufacturing environment or incoming data samples are lost.

In accordance with the invention, the DMA units in units 112 and 114 are modified so that when the word count in the respective word counter reaches zero, an interrupt is generated, but the DMA units continue transfer operations. Therefore the DMA controller performs continuously and is called a Continuous Performance DMA controller ("CP-DMA") controller.

Figure 2:
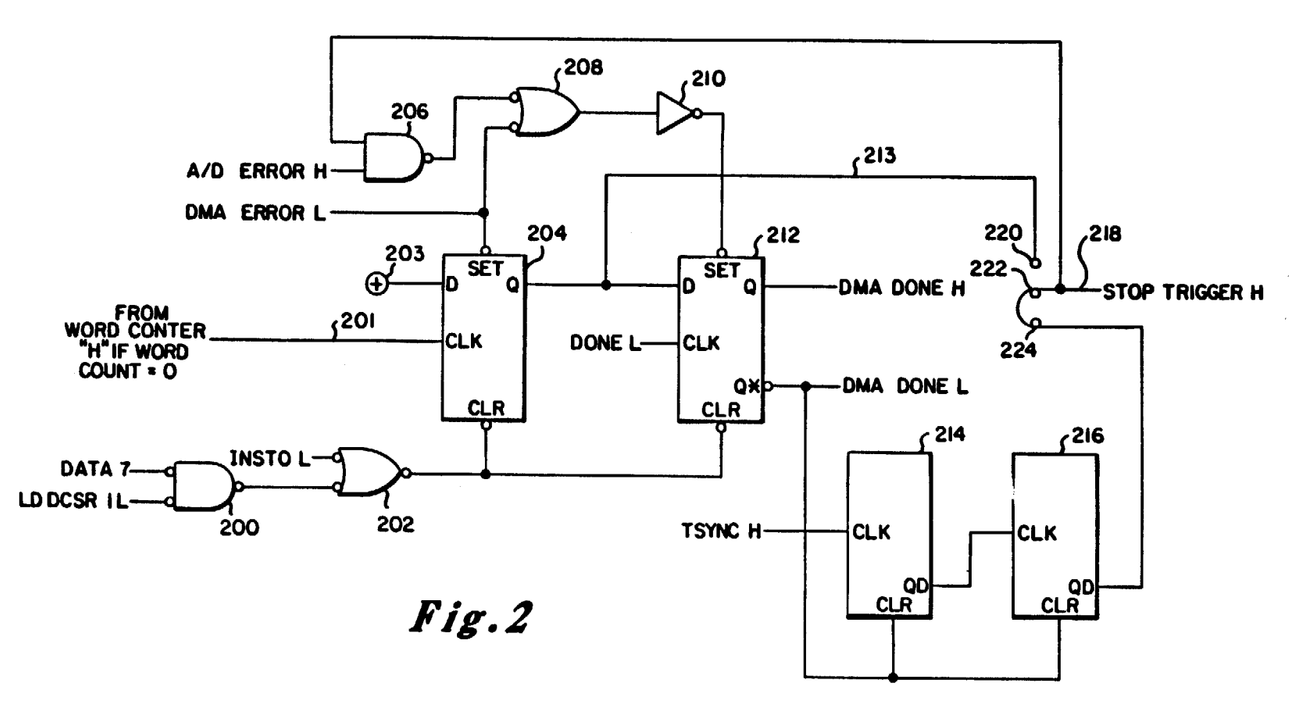
FIG. 2 is an electrical schematic diagram of a portion of the interrupt generation circuitry in an analog-to-digital convertor unit showing illustrative modifications.

FIG. 2 of the drawing shows a typical modification in accordance with the present invention to DMA circuitry unit to enable the unit to continue operation after an interrupt has been generated. The actual circuitry shown in FIG. 2 is for use with a data acquisition unit and incorporates error checking circuitry to make sure that the transfer of information into the buffer area does not exceed the amount of storage in the buffer's overrun area.

In particular, the completion of a DMA transfer is controlled by flip/flops 204 and 212. Flip/flop 212 generates two signals, DMA DONE H and DMA DONE L which are provided to the associated interrupt logic causing it to generate an interrupt to the system processor.

Flip/flops 204 and 212 are cleared upon the initiation of a DMA operation by gates 200 and 202. In particular, when a DMA operation is performed, data bit number 7 is "low" causing a "low" signal to be applied to the upper input of gate 200. During the DMA operation, the data is strobed and a "low" signal appears on lead LD DCSR 1L which is applied to the lower input of gate 200. The two "low" inputs cause gate 200 to provide a "low" signal to the lower input of gate 202 which, in response thereto, applies a "low" signal to the clear inputs of flip/flops 204 and 212, clearing them. Flip/flops 204 and 212 may also be cleared when circuit power is initially turned on by a "low" signal placed on the INITO L lead by conventional reset circuitry. The "low" INITO L signal also causes gate 202 to generate a "low" output clearing flip/flops 204 and 212.

Flip/flops 204 and 212 remain cleared until a "high" signal is applied, via lead 201, to the clock input of flip/flop 204. This "high" signal is generated from the word counter if the word count equals zero by conventional logic (not shown). As previously described, the zero word count condition occurs after the number of words to be transferred as specified by the processor have, in fact, been transferred. This "high" signal clocks flip/flop 204 which is a conventional positive-edge-triggered, D-type flip/flop. Since the D input of flip/flop 204 is connected to positive voltage source 203, a "high" signal appears at its Q output, which "high" signal is provided to the D input flip/flop 212.

Flip/flop 212 is in turn blocked by a signal on the DONE L lead which is provided by other portions of the DMA circuitry after the DMA transfer operation the has been completed. When the DONE L signal appears, flip/flop 212 applies a "high" signal to its output Q and a "low" signal to its output Q*. These signals are provided, as previously described, to the interrupt circuitry in the convertor to cause an interrupt to be generated.

In a conventional DMA unit, the output, Q, of flip/flop 204 would be provided, via lead 213, to terminal 220 and terminal 220 would be connected to terminal 222 by a jumper so that a "high" signal at the output of flip/flop 204 would place a "high" signal on the STOP TRIGGER H lead 218. A "high" signal on this lead inhibits the trigger signal which starts an A/D conversion, therefore no further conversions would be performed. However, in accordance with the invention, the connections between terminals 220 and 222 are disconnected so that a STOP TRIGGER signal is not generated at the end of the DMA transfer sequence.

Instead, the STOP TRIGGER signal is generated only if an error condition occurs (the number of words transferred after an interrupt occurs exceeds the predetermined buffer overrun capacity). This error condition is detected by the counter circuit consisting of flip/flops 214 and 216. Specifically, the "low" signal appearing on the DMA DONE L lead at the completion of a DMA operation is applied to the clear inputs of counters 214 and 216 effectively enabling them. Counters 214 and 216 are conventional divide by sixteen ripple counters and are connected together to form a divide by 128 counter.

More specifically, the clock input of counter 214 is connected to the TSYNCH lead which is strobed every time a data conversion is completed by the associated A/D circuitry. Therefore, after an initial eight counts, a "low"-to-"high" transition will occur on the output QD of counter 214 which will, in turn, clock counter 216. Likewise, after every sixteen strobe pulses appearing on the TSYNCH lead counter 216 will also be advanced. After 128 strobe pulses on the TSYNCH lead have occurred a "high" signal will appear at the QD output of counter 216 which will be applied to terminal 224. Since terminal 224 is connected to terminal 222 the associated A/D convertor will be stopped 128 conversions after the DMA unit has completed a transfer.

Flip/flops 204 and 212 may also be set to indicate the end of a DMA operation upon occurrence of certain error conditions. In particular, if a stop trigger signal occurs on lead 218, a "high" signal is applied to the upper input of gate 206. If an A/D error also occurs, a "high" signal appears on lead A/D ERROR H provided by the A/D convertor circuitry. The two "high" inputs, in turn, enable gate 206 which applies a "low" signal to the upper input of gate 208. In response thereto gate 208 applies a "high" signal to inverter 210. Inverter 210, in turn, applies a "low" signal to the set input of flip/flop 212 causing the flip/flop to provide a DMA DONE signal to the interrupt circuitry. Flip/flops 204 and 212 may also be set by a "low" signal appearing on the DMA ERROR L lead produced by DMA circuitry. The "low" DMA ERROR L signal is applied to the set input of flip/flop 204 and to the lower input of gate 208 which, in turn, sets flip/flop 212, via inverter 210.

Figure 3:
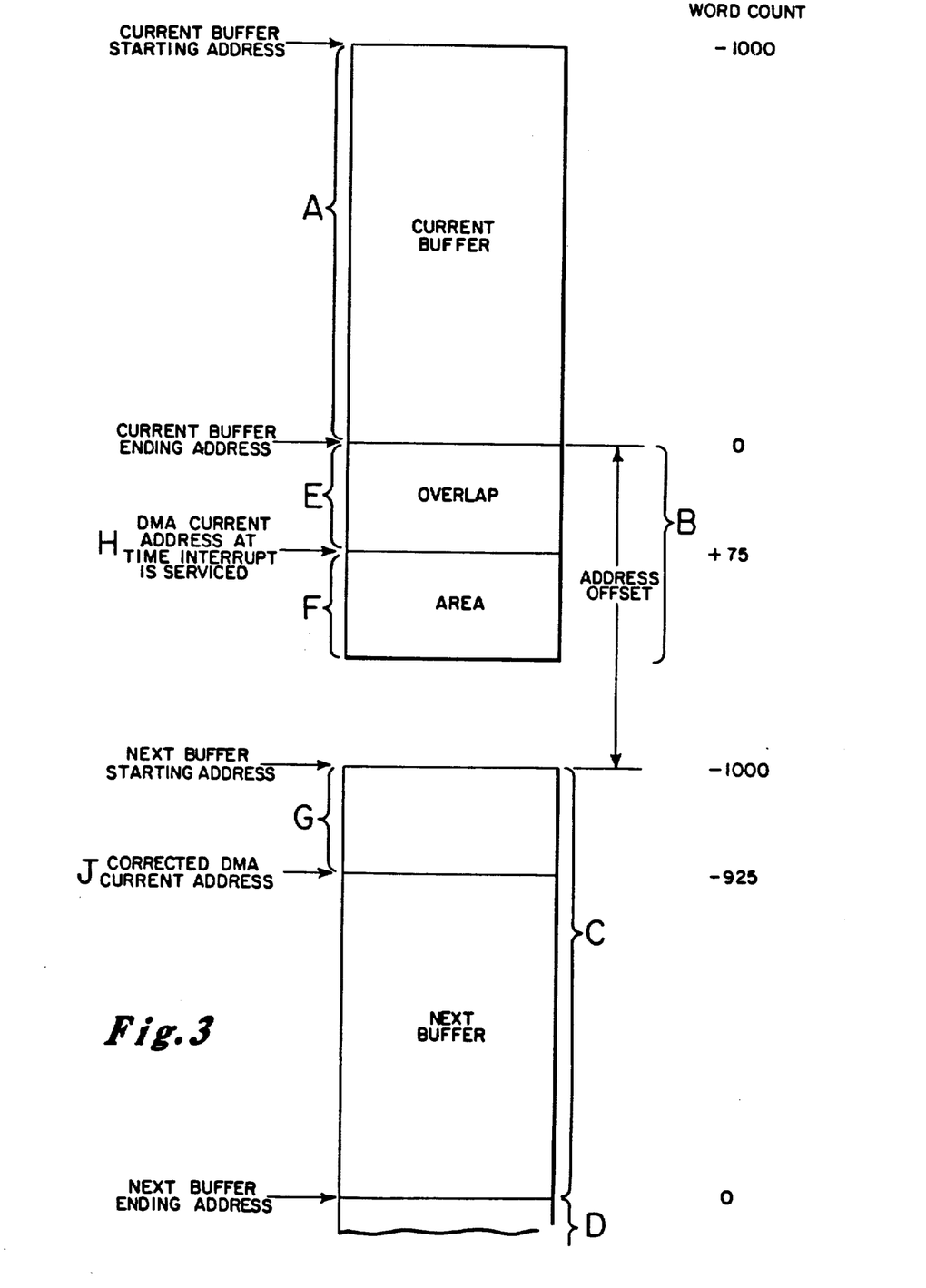
FIG. 3 of the drawing is a schematic representation of the arrangment of data in the buffer memory areas.

FIG. 3 shows in schematic form, the arrangement of the storage buffers in the secondary storage unit. Each buffer area, such as buffer area A, consists of a plurality of storage locations with sequential addresses. Buffer area A may contain only a few storage locations or may contain many thousands.

In accordance with one aspect of the invention, immediately following each buffer area is a dedicated overrun buffer which consists of a predetermined number (128 is used in the illustrative embodiment) of locations. For example, buffer A is followed by overrun buffer B. Buffer C also ahs a corresponding overrun buffer D. In the illustrative embodiment, each overrun area begins immediately following the buffer ending address and continues for 128 consecutive locations. However, the overrun area can consist of any predetermined number of storage locations. The next memory buffer need not follow the previous buffer's overrun area.

Data to be transferred is stored in sequential buffers which may be located at different areas in memory. For example, buffer A may contain part of a data record and the remaining data may be contained in buffer C. Associated with each buffer is a word count which indicates the number of locations contained in the buffer memory area.

Figure 4:
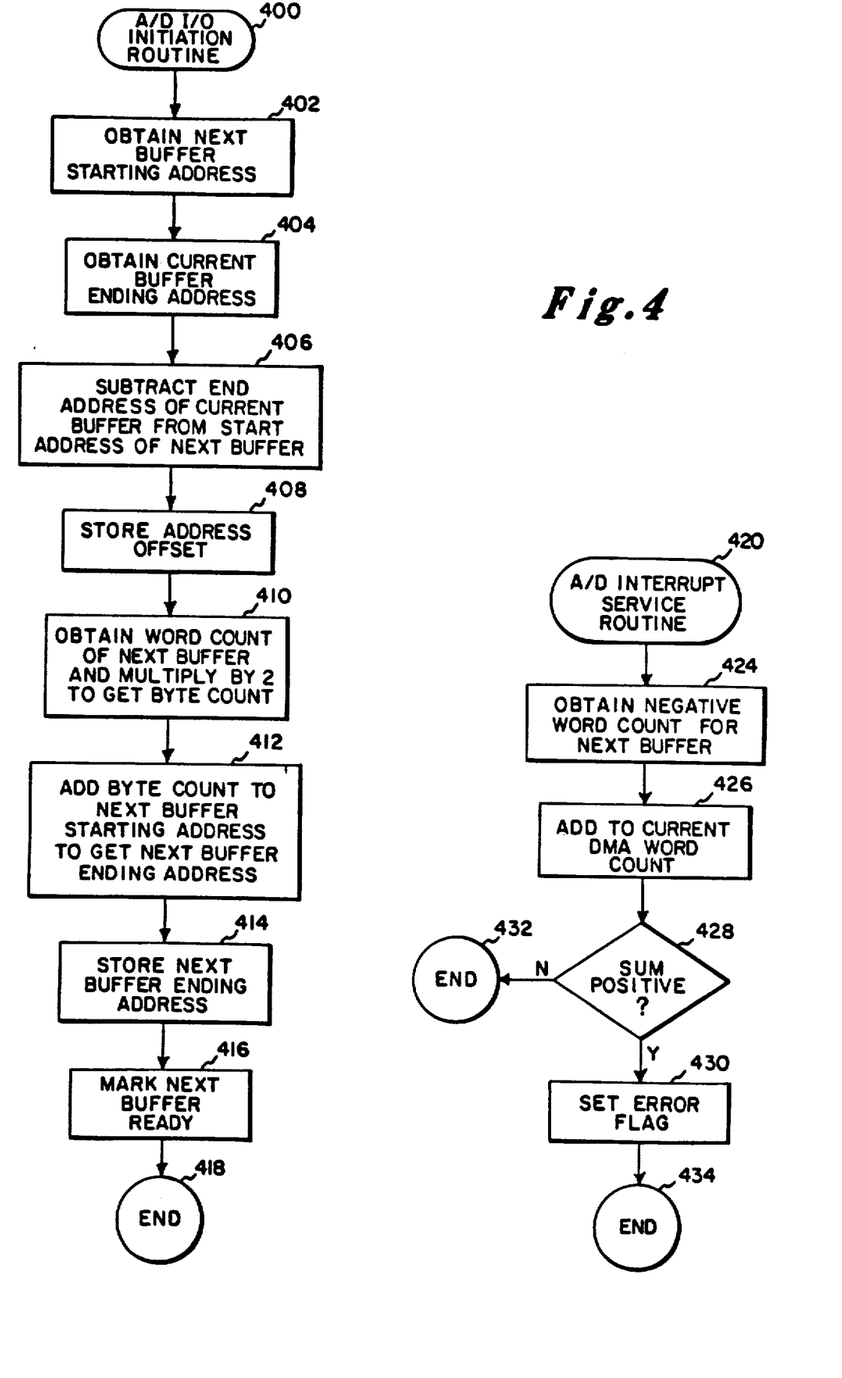
FIG. 4 of the drawing is a flow chart of the routine used to transfer information from a data acquisition unit into buffer memories.

FIG. 4 shows the detailed steps in a routine (ZA.-MAC) performed by the processor in transferring information from a data acquisition unit into main memory. The ZA.MAC routine is divided into two other routines. One of these other routines is performed by the processor prior to receiving an interrupt generated by the data acquisition unit. This routine is titled the "I/O initiation" routine and it establishes initial values which are stored and used by the other portion of the ZA.-MAC routine. The other portion, the "Interrupt Service" routine processes the interrupt generated by the CP-DMA.

The routines operate with the starting addresses and the word counts for two buffer areas at a time. One buffer is called the current buffer (for example, buffer A in FIG. 3) and is the buffer into which data is presently being transferred. The other buffer (for example, buffer C) is called the next buffer and is prepared for data transfer by the routine.

The I/O initiation routine 400 starts at step 402 at which the starting address of the next buffer is passed to it from the application program.

In step 404, the ending address of the current buffer is obtained from a storage location in which the ending address was previously stored as will be hereinafter described.

In step 406, the ending address of the current buffer is subtracted from the starting address of the next buffer to obtain an "address offset". As shown in FIG. 3 this "offset" indicates the number of storage locations or words between the end of the current buffer and the beginning of the next buffer (this offset may be negative). In step 408, the calculated address offset is stored for use by the Interrupt Service routine.

In step 410, the word count for the next buffer is multiplied by two to get the number of bytes in the buffer (called the "byte offset) and, in step 412, the byte offset is added to the starting address of the next buffer to get the ending address for the next buffer. In step 414, the next buffer ending address is stored for subsequent use by the Interrupt Service routine.

The I/O initiation routine then marks the next buffer ready for transfer in step 416 and ends in step 418.

The I/O initiation routine may be run either to begin a CP-DMA transfer or called during a CP-DMA transfer to specify the next buffer to use once the current transfer is completed. In either case, data transfer continues sequentially, word-by-word, until the number of words specified by the word count have been transferred, at which point the word count in the word counter becomes zero and an interrupt is generated to the computer system.

The routine performed by the computer system in processing the interrupt is shown in FIG. 4 as the Interrupt Service routine 420. This routine corrects the DMA current address and word count for the next buffer taking into account the fact that some information has been stored in the current buffer's overrun area while the computer began the interrupt processing cycle.

In particular, in step 422 of the Interrupt Service routine the CP-DMA current address is corrected by adding the address offset stored in step 408 of I/O Initiation routine to the address stored in the current address register of the DMA unit. In order to achieve proper operation this addition must be performed with an ADD instruction which is of the read-modify-write type and as such is uninterruptable. That is, the system bus is "locked" during the whole instruction so that the CP-DMA controller cannot perform a data transfer betwee the beginning and end of the ADD instruction. Otherwise the DMA word count register might be changed during the ADD instruction resulting in an error.

This addition is done while the CP-DMA unit is in the process of transferring data and causes the CP-DMA unit to redirect the data to the next buffer without any delay. For example, if the ADD instruction is executed just after the CP-DMA transfers a data word into the location H in overrun buffer B the next data word will be placed in buffer C at location J. The number of data words transferred into the overlap buffer B equals the number of locations skipped over in buffer C. The Unthreading routine (to be described) must subsequently move the data words from section E of overrun buffer B into section G of buffer C.

The Interrupt Service proceeds with steps 424 and 426 by adding the negative word count for the next buffer, B, to the CP-DMA word count register. Because the value of this register will be slightly positive (the length of section E) the resulting value should be somewhat less negative that the actual buffer length. This insures that the CP-DMA will generate an interrupt at the end of buffer B.

In step 428, a check is performed to see whether the sum resulting from step 426 is positive. If it is not, the routine is finished in step 432. If the sum is positive, this indicates that the buffer was too small and that an overrun has already occurred prior to the completion of interrupt processing. In this case, an error flag is set in step 430 and the routine ends in step 434.

The operations of the I/O Initiation routine and the Interrupt Service routine shown in FIG. 4 result in the storage of incoming data in "threaded" buffers, in that some data is stored in the overrun areas common to the sequential buffers. In order to place the data into proper form for processing the buffers must be "unthreaded" by moving the data stored in the overrun areas into the appropriate areas in the next succeeding buffer.

Figure 5:
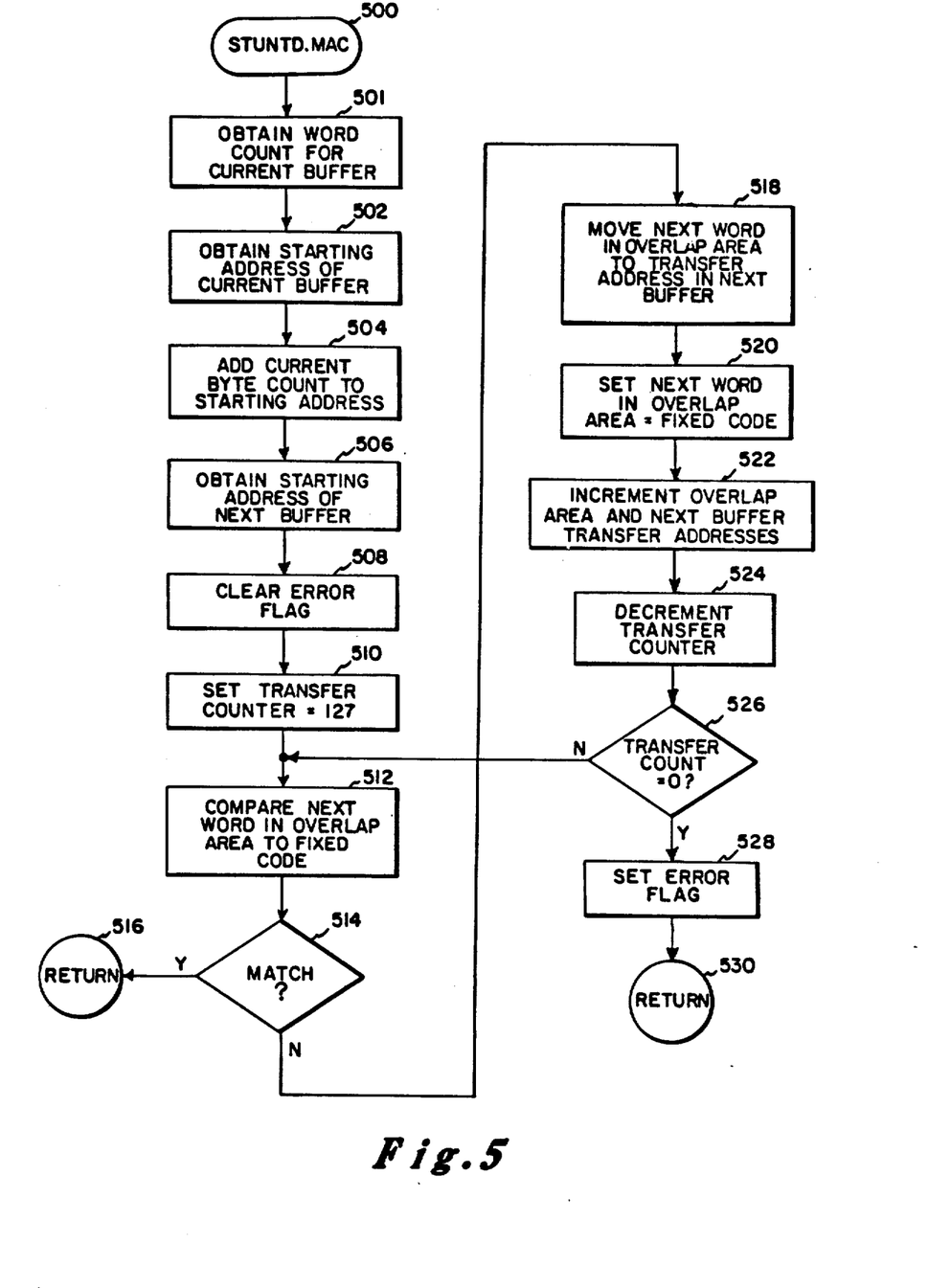
FIG. 5 is a flow chart of the routine used to "unthread" buffers after operation of the routine shown in FIG. 4.

A flowchart of the unthread routine (STUNTD.MAC) is shown in FIG. 5. In this routine the computer searches through each overrun area and determines how much data is stored therein and then transfers the data to the beginning of the next succeeding buffer. Since the amount of data stored in the overrun area depends on the amount of time which the computer system took to service the interrupt which resulted in data storage in the next buffer, the number of words which will be stored in the overrun area may vary.

In order to determine how much data has been stored in the overrun area, the computer examines each word sequentially in the buffer area. As previously mentioned, prior to beginning a data transfer each word in the overrun area has been written with a code which cannot occur in the data. A number which may be used in the illustrative embodiment is the binary number 1001000000000000 which cannot appear in the data because the A/D converters in the illustrative embodiment always generate data words in which the high order four bits have the same value (for example, "0000" or "1111"). Therefore, in order to determine how much data has been stored in the overrun area the computer examines each word and if it is not the predetermined code, the word is transferred to the appropriate location in the next buffer memory. When a predetermined code word is detected the transfer operation is complete and the buffers are "unthreaded".

The unthread routine STUNTD.MAC 500 begins in step 501 when the routine obtains the word count of the current buffer and in step 502, the starting address of the current buffer is obtained.

In step 504 the retrieved byte count (twice the word count) is added to the retrieved starting address to get the start of the current buffer's overrun area.

Subsequently, in step 506, the routine obtains the starting address next buffer, in order to be able to transfer the non-code words from the overrun area into the next buffer.

In step 508 an error flag is cleared to begin the operation. This flag will be set later if an error is detected.

In step 510, a transfer counter is set to the value 127. This counter is used to count the number of words transferred from the overrun area into the next buffer. If this number exceeds 128, the predetermined total number of words in the overrun area, an error flag will be set.

In step 512 the first word in the current buffer overrun area is compared to the fixed code, and, in step 514, if a match occurs the unthreading operation is complete and the routine returns in step 516. If there is no match, the first word in the current buffer overrun area is moved to the first address location in the next buffer as shown in step 518.

The first word in the current buffer overrun area is then set to the fixed code (step 520) in order to reinitialize the buffer for the next transfer operation.

In step 522 the transfer address of the current buffer overrun area is incremented and the transfer address of the next buffer is incremented to prepare for transfer of another word.

In step 524 the transfer counter is decremented by one and in step 526 the count in transfer counter is checked to see if it equals zero. If it does, 128 words (the maximum number which can be stored in the overrun area) have been transferred without detecting the predetermined code word, an error flag is set in step 528 and the routine returns in step 530. If less then 128 words have been transferred the routine returns to step 512 and compares the next word in the overrun area to the fixed code.

Operation continues in this manner until all words, down to the fixed code word, have been transferred from the overrun area into the next buffer area. There will always be the exact number of spaces at the beginning of the next buffer area since during the restart of the DMA operation the address offset wa added to the DMA starting address in order to cause the proper number of spaces to be skipped over by the DMA unit.

Operation of the data transfer system for a transfer from the buffers to the signal generation device is similar to the routines previously described. In this transfer operation the buffer memories must be first "threaded" so that a data transfer can take place uninterrupted even when the computer is processing a DMA interrupt.

Figure 6:
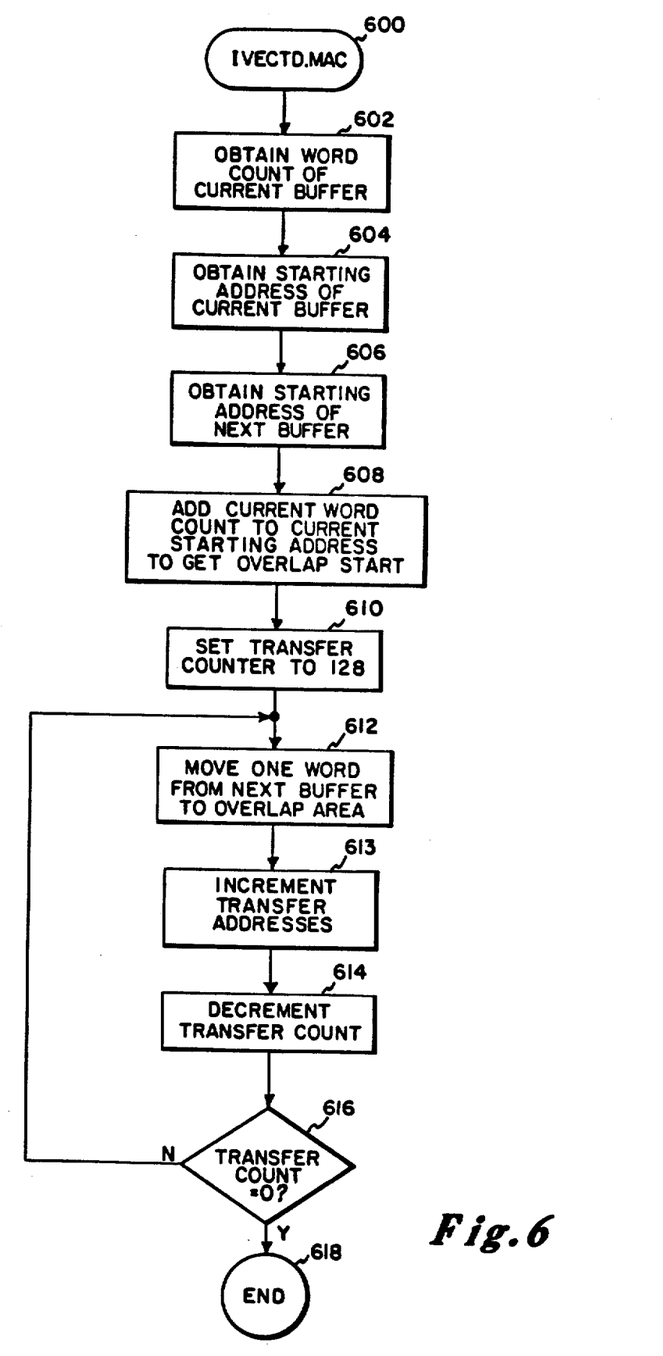
FIG. 6 is a flow chart of the routine used to thread buffers together in preparation for a data transfer from the buffer memories to a signal generation unit.

The IVECTD.MAC routine which threads the buffer memories is shown in FIG. 6. The IVECTD.MAC routine 600 begins in step 602 in which the routine obtains the word count of the current buffer and the starting address of the buffer in step 604. Next, in step 606, the routine obtains the starting address of the next buffer.

In step 608, the routine adds the length in bytes of the current buffer to its starting address to get the start of the current buffer overrun area.

In step 610, a transfer counter is set to 128 to initialize the threading routine, and, in step 612, the routine moves one word at the starting address of the next buffer to the first address location in the overrun area of the preceeding current buffer. In step 613, the current buffer transfer address is incremented as well as the next buffer transfer address.

In step 614, the transfer counter is decremented and, in step 616, the transfer counter is checked to see if its count equals zero. If the count is zero, the overrun area has been completely filled with data from the next buffer and the routine is done in step 18, if the count is not zero, the routine returns to step 612 and moves another word over.

Operation continues in this manner until 128 words have been moved from the start of the next sequential buffer into the overrun area of the preceeding buffer. When this has been done the buffers are "threaded" and transfer of the information from the memory to the signal generation device can begin.

Figure 7:
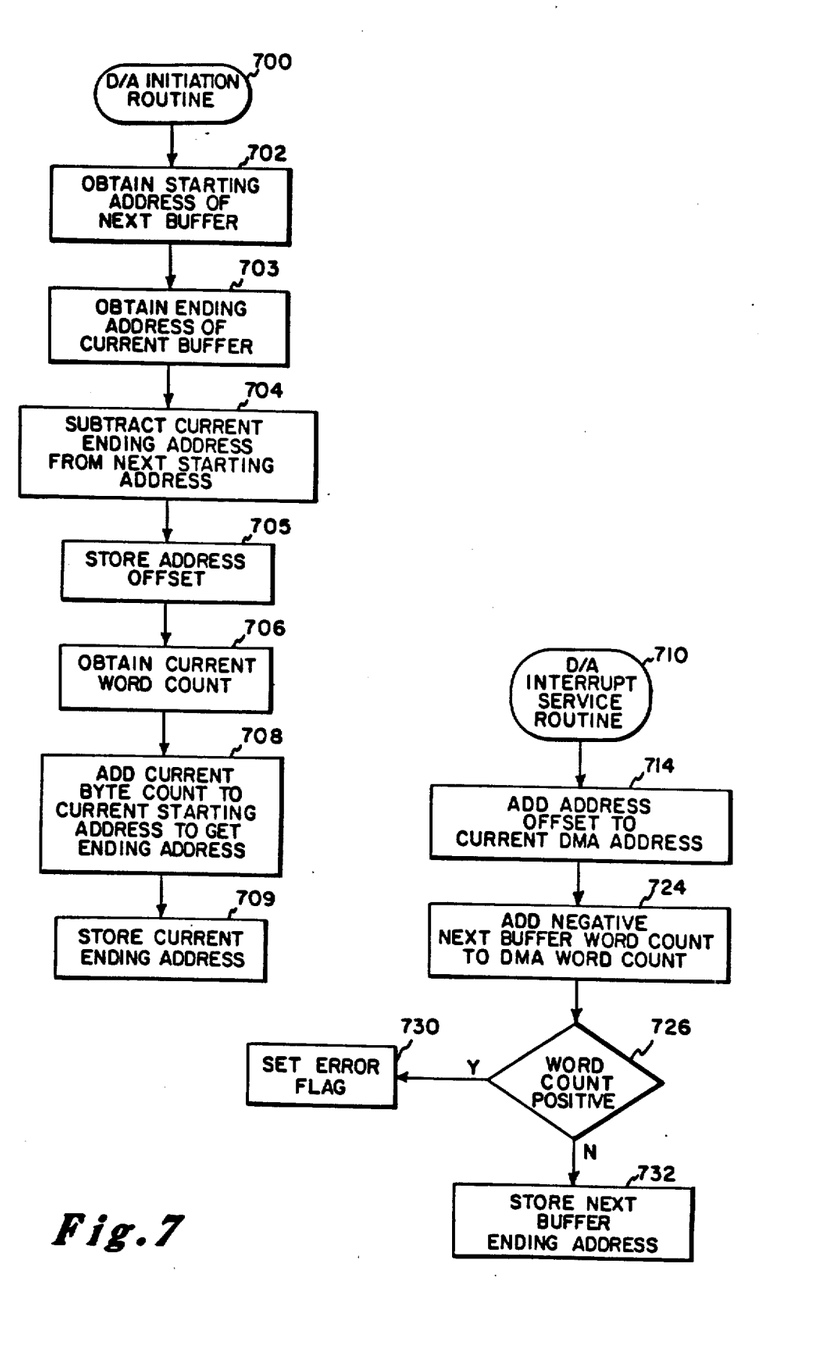
FIG. 7 of the drawing is a flow chart of the routine used to transfer information from the buffer memories to a signal generation unit.

The data transfer routines are shown in FIG. 7. As with the data acquisition unit-to-memory transfer routines, the memory-to-signal generation device routine consists of two parts; one which is performed prior to an interrupt being generated by the DMA unit and a second routine which processes the interrupt.

The D/A I/O Initiation routine starts in step 702 in which the starting address of the next buffer is obtained from a storage location.

In step 703 the ending address of the current buffer is obtained from a storage location. This ending address is calculated by another routine.

In step 704, the ending address of the current buffer is subtracted from the starting address of the next buffer to get the address offset. This offset is stored in step 705.

In step 706, the routine obtains the word count of the current buffer and in step 708 the word count is added to the starting address of the present buffer to get the ending address of the current buffer which is stored in step 709 for use later by the subsequent routine and the next operation of the I/O Initiation routine.

Having calculated the preliminary update values, the computer then begins transfer of data from the memory to the signal generation device where the data words are translated and used to control the manufacturing environment. The D/A Interrupt Service routine 710 and begins in step 714 in which the routine corrects the current CP-DMA address by adding to it the address offset calculated in step 705 to get the address in the next buffer at which data transfers will continue.

As with the previously described A/D Interrupt service routine, in order to achieve proper operation this addition must be performed with an ADD instruction which is of the read-modify-write type and as such is uninterruptable. That is, the system bus is "locked" during the whole instruction so that the CP-DMA controller cannot perform a data transfer between the beginning and end of the ADD instruction. Otherwise the DMA address register might be changed during the ADD instruction resulting in an error.

The D/A Interrupt Service proceeds with steps 724 by adding the negative word count for the next buffer, B, to the CP-DMA word count register. Because the value of this register will be slightly positive (the length of section E) the resulting value should be somewhat less negative that the actual buffer length. This insures that the CP-DMA will generate an interrupt at the end of buffer B.

In step 726, the word count is checked. A positive word count indicates that there is an error and an error flag is set is step 730. If the word count is not positive, in step 732, the ending address for the next buffer is stored and transfer of information continues out of the next buffer.

What is claimed is:

1. Computer apparatus for continuously transferring data words from a peripheral unit to a plurality of buffer memories, each of said said buffer memories having a plurality of storage locations with sequential addresses for storing a predetermined number of data words, said apparatus comprising, a plurality of overrun memory areas, each of said overrun memory areas having a predetermined number of storage locations and being assigned to one of said plurality of buffer memories, a direct memory access circuit responsive to data words generated by said peripheral unit for storing said data words in sequential storage locations in a first one of said buffer memories, said direct memory access circuit comprising, means responsive to the storage of each data word in said first one of said buffer memories generating a count number indicating the total number of data words stored in said first buffer memory, and means responsive to said count number for generating an interrupt signal when said first buffer memory becomes filled with data words, said direct memory access circuit continuing to store data words in storage locations with sequential addresses in said overrun memory area associated with said first buffer memory, and means responsive to said interrupt signal for controlling said direct memory access circuit to store data words received from said peripheral unit in a second one of said buffer memories starting at a location spaced from the beginning of said second buffer memory a number of locations equal to the number of data words stored in said overrun memory area assigned to said first buffer memory.

2. Computer apparatus according to claim 1 further comprising means responsive to the storage of data words in said second one of said buffer memories by said direct memory access circuit for moving data words stored in said overrun memory assigned to said first buffer memory to locations with sequential addresses at the beginning of said second buffer memory.

3. Computer apparatus according to claim 2 further comprisng means for preparing said overrun memories for data word storage prior to data word transfers from said peripheral unit to said buffer memories by storing a predetermined code word in all locations of all of said overrun memories, said code word consisting of a code which cannot appear in said data words.

4. Computer apparatus according to claim 3 wherein said direct memory access circuit stores data words in said overrun memory after said first buffer memory has become filled with data words and each data word stored in a location in said overrun memory overwrites the code word previously stored at said overrun memory location.

5. Computer apparatus according to claim 4 wherein said moving means comprises means responsive to the storage of data words in said second one of said buffer memories by said direct memory access circuit for comparing each data word stored in said overrun memory associated with said first buffer memory to said predetermined code word and means controlled by said comparing means for moving each data word which does not match said code word to said second buffer memory.

6. Computer appartus according to claim 5 wherein said moving means sequentially moves each of said data words starting with the data word stored at the location corresponding to the first address.

7. Computer apparatus for continuously transferring data words from an ordered sequence of buffer memories to a peripheral unit, each of said buffer memories having a plurality of storage locations for storing a predetermined number of data words, said apparatus comprising, a plurality of overrun memories, each of said overrun memories having a predetermined number of storage locations and being assigned to one of said plurality of buffer memories, means operating prior to a transfer of any data words from said plurality of buffer memories to said peripheral unit for threading said buffer memories together by transferring data words to the overrun memory associated with each buffer memory from the buffer memory immediately following in said ordered sequence until each overrun memory is filled with data words, a direct memory access circuit for sequentially transferring data words from sequential locations in a first one of said buffer memories to said peripheral unit, said direct memory access circuit transferring data words from sequential storage locations in said overrun memory assigned to said first buffer memory to said peripheral device when said first buffer memory is empty of data words, means for counting the number of data words transferred by said transferring means from said first buffer memory and said overrun memory, said counting means generating an interrupt signal when said first buffer memory becomes empty of data words, and means responsive to said interrupt signal for restarting said direct memory access circuit so that said direct memory access circuit transfers data words to said peripheral unit from said second one of said buffer memories starting at a location spaced from the beginning of said second one of said buffer memories a number of locations equal to the number of data words transferred by said direct memory access circuit from said overrun memory associated with said first buffer memory.

8. Computer apparatus according to claim 7 wherein said threading means comprises a counter, means for initially setting said counter to a predetermined count equal to the total number of locations in said overrun memory, means responsive to each transfer of a data word from said following one of said buffer memories to said overrun memory for decrementing said counter and means responsive to the count remaining in said counter for stopping the transfer of data words from said following one of said buffer memories to said overrun memory when said count reaches zero.

9. Computer apparatus according to claim 8 wherein said direct memory access circuit transfers data words from said overrun memory associated with said first buffer memory to said peripheral unit after said interrupt signal has been generated, but before said restarting means restarts said direct memory access circuit to begin transferring data words from said second one of said buffer memories to said peripheral unit.

10. Computer apparatus according to claim 9 wherein said direct memory access circuit comprises a register for storing a starting address and means for transferring data words located at said starting address and sequential locations and said restarting means comprises means responsive to said interrupt signal for setting said starting address in said register to the address of a location spaced from the beginning of said second one of said buffer memories a number of locations equal to the number of data words previously transferred by said direct memory access circuit from said overrun memory associated with said first buffer memory.

11. Computer apparatus for continuously receiving data words from a peripheral unit, said apparatus comprising, a plurality of memory areas for temporarily storing said data words, each of said memory areas comprising a buffer memory having a plurality of storage locations with sequential addresses for storing a predetermined number of data words and an overrun memory having a predetermined number of storage locations with addresses sequentially following the addresses of locations of said buffer memory, means for preparing all of said overrun memories for data word storage prior to data word transfers from said peripheral unit by storing a predetermined code word in all locations of all of said overrun memories, said code word consisting of a code which cannot appear in said data words, means for determining an address offset indicating the number of storage locations between the end of a first buffer memory area and the start of a second buffer memory, means for determining a word count number indicating the total number of data words which can be stored in said first buffer memory, a direct memory access circuit responsive data words generated by said peripheral unit for storing said data words in sequential storage locations in said first buffer memory, said direct memory access circuit comprising means for maintaining a current address indicating the next address in said first buffer memory into which a data word will be stored, and means responsive to said word count number for generating an interrupt signal when said first buffer memory becomes filled with data words, said direct memory access circuit continuing to store data words in storage locations with sequential addresses in said overrun memory associated with said first buffer memory, each data word stored in a location in said overrun memory overwriting the code word previously stored at said overrun memory location, means responsive to said interrupt signal, said address offset and said current address for adding said address offset to said current address to cause said direct memory access circuit to store data words received from said peripheral unit in said second buffer memory starting at a location spaced from the beginning of said second buffer memory a number of locations equal to the number of data words stored in said overrun area, and means responsive to the storage of data words in said second buffer memory by said direct memory access circuit for moving data words stored in said overrun memory assigned to said first buffer memory to locations with sequential addresses at the beginning of said second buffer memory.

12. Computer appartus according to claim 11 wherein said moving means comprises means responsive to the storage of data words in said second one of said buffer memories by said direct memory access circuit for sequentially examining each each data word stored in said overrun memory associated with said first buffer memory starting with the first location following said buffer memory, said examining means including means for comparing each data word to said predetermined code word and means controlled by said comparing means for moving deach data word which does not match said code word to said second buffer memory.

13. Computer apparatus for continuously transferring data words to a peripheral unit, said apparatus comprising, a plurality of memory areas for temporarily storing said data words, each of said memory areas comprising a buffer memory having a plurality of storage locations with sequential addresses for storing a predetermined number of data words and an overrun memory having a predetermined number of storage locations with addresses sequentially following the addresses of locations of said buffer memory, means for threading all of said overrun memories for data word transfer prior to data word transfers from said peripheral unit by sequentially transferring data words to the overrun memory associated with each buffer memory from the beginning of the buffer memory immediately following in said ordered sequence until each overrun memory is filled with data words, means for determining an address offset indicating the number of storage locations between the end of a first buffer memory area and the start of a second buffer memory, means for determining a word count number indicating the total number of data words which are stored in said first buffer memory, a direct memory access circuit responsive to data words generated by said peripheral unit for transferring said data words in sequential storage locations in said first buffer memory to said peripheral unit, said direct memory access circuit comprising means for maintaining a current address indicating the next address in said first buffer memory from which a data word will be transferred, and means responsive to said word count number for generating an interrupt signal when said first buffer memory becomes empty of data words, said direct memory access circuit continuing to transfer data words from storage locations with sequential addresses in said overrun memory associated with said first buffer memory, means resonsive to said interrupt signal, said address offset and said current address for adding said address offset to said current address to cause said direct memory access circuit to transfer data words to said peripheral unit from said second buffer memory starting at a location spaced from the beginning of said second buffed memory a number of locations equal to the number of data words transferred from said overrun area.

* * * * *